R. E. HELLMUND.
SELF COMPOUNDING PHASE CONVERTER.
APPLICATION FILED JULY 11, 1916.

1,376,428.

Patented May 3, 1921.
3 SHEETS—SHEET 1.

WITNESSES:
Fred. A. Lind.
D. C. Davis

INVENTOR
Rudolf E. Hellmund
BY
ATTORNEY

R. E. HELLMUND.
SELF COMPOUNDING PHASE CONVERTER.
APPLICATION FILED JULY 11, 1916.

1,376,428.

Patented May 3, 1921.
3 SHEETS—SHEET 2.

WITNESSES:
Fred. A. Lind.
O. C. Davis.

INVENTOR
Rudolf E. Hellmund
BY
ATTORNEY

R. E. HELLMUND.
SELF COMPOUNDING PHASE CONVERTER.
APPLICATION FILED JULY 11, 1916.
1,376,428.
Patented May 3, 1921.
3 SHEETS—SHEET 3.
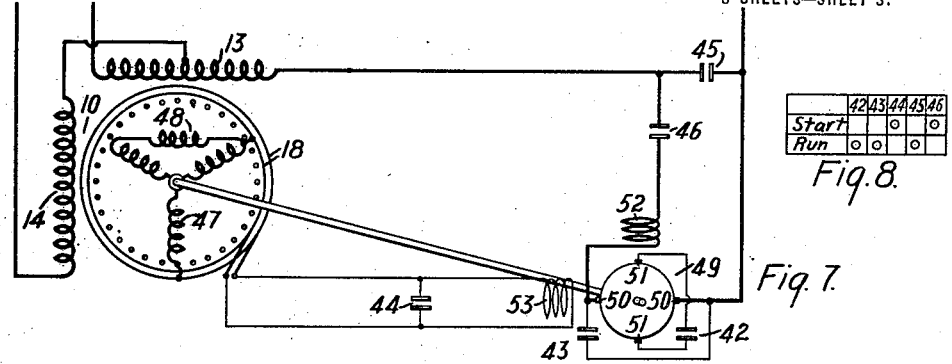
Fig. 7.
Fig. 8.
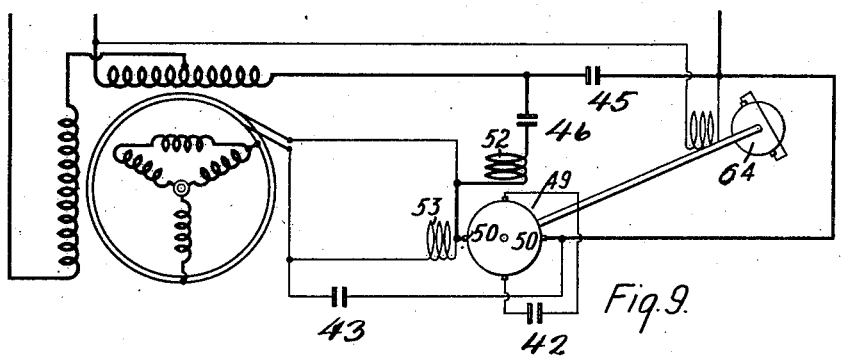
Fig. 9.
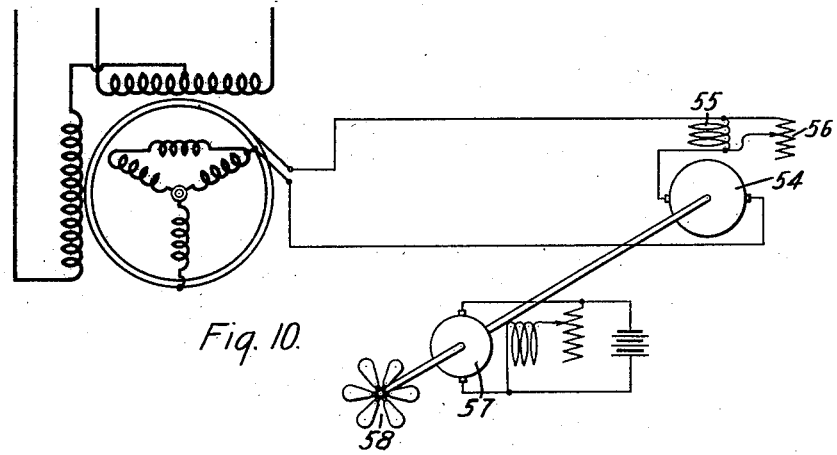
Fig. 10.
WITNESSES:
Fred. A. Lind
D. C. Davis
INVENTOR
Rudolf E. Hellmund
BY
Wesley G. Carr
ATTORNEY dz
UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SELF-COMPOUNDING PHASE-CONVERTER.

1,376,428.  Specification of Letters Patent.  Patented May 3, 1921.

Application filed July 11, 1916. Serial No. 108,567.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Self-Compounding Phase-Converters, of which the following is a specification.

My invention relates to regulating apparatus for phase converters of the rotary type, and it has for its object to provide means whereby the different component voltages in apparatus of the character designated may be automatically regulated, with respect to each other, throughout wide variations in load.

Figure 1:
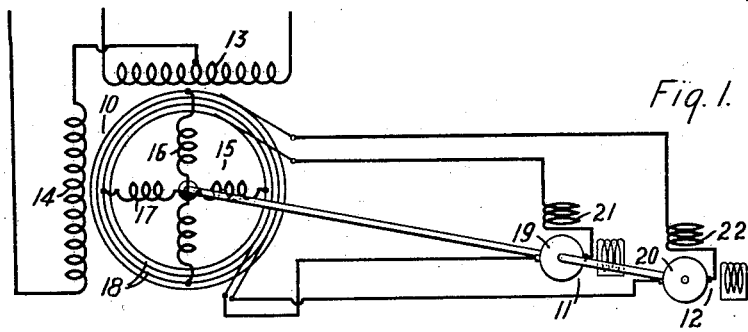

In the accompanying drawing, Figure 1 is a diagrammatic view of a phase converter, together with its associated apparatus embodying one form of my invention, Figs. 2 to 7, inclusive, 9 and 10 are diagrammatic views of modifications of the system shown in Fig. 1; and Fig. 8 is a sequence chart setting forth the order of switch operation in the system of Fig. 7.

In the operation of phase converters, such, for example, as those employed for deriving three-phase current from a single-phase source or for balancing unbalanced polyphase systems, it is a well known fact that, with an increase of load there is a tendency for the tertiary induced voltage to fall off because of the drops in the primary and secondary circuits. This is an undesirable condition as it promotes unbalancing in the polyphase distributing system, with resultant unsatisfactory operation of polyphase apparatus embodied therein. By my invention, I provide means whereby an extraneous voltage is introduced into the secondary winding for forcing the load current therethrough, and, by suitable adjustment of said auxiliary voltage, the drop across the rotary terminals may be suitably compensated for and I may, in fact, by a further increase in said auxiliary voltage, compensate for the voltage drops in the primary winding itself and associated apparatus.

It has been found that the load currents in the secondary circuits of a phase converter are of twice the frequency of the supply and it is therefore necessary that the above-mentioned auxiliary compensating voltage be of double frequency in order to properly perform its function.

Other features of my invention will hereinafter more fully appear.

Referring to Fig. 1 for a more detailed understanding of my invention, I show a phase converter of the rotary type at 10 with which are associated two auxiliary booster machines 11 and 12. The machine 10 is provided with a primary stator winding 13, a tertiary stator winding 14 and a rotor 15 upon which are mounted two secondary windings 16 and 17 bearing a quarter-phase relation to each other. The terminals of the rotor windings 16 and 17 are connected, respectively, to suitable slip rings 18. The auxiliary booster machines 11 and 12 are of the series commutating type, being provided with armatures 19 and 20 and with main field windings 21 and 22, respectively. The machines 11 and 12 may be connected to be driven by any suitable means, as, for example, by being attached to the shaft of the phase converter, as indicated. The machine 11 is connected across the terminals of the rotor winding 17 and, in like manner, the machine 12 is connected across the terminals of the rotor winding 16.

Having thus described the arrangement of a system embodying my invention, the operation is as follows. Assuming that the phase converter 10 has been started in any suitable manner, the rotor speed is practically synchronous, there being merely sufficient slip to provide for friction, windage, electrical losses and the driving of the auxiliary machines 11 and 12. The voltage driving the double-frequency load currents through the resistance of the rotor windings cannot therefore be induced by the rotor slip, as in the case of the ordinary induction motor, but must, in the ordinary phase converter, be induced therein by transformer action from the primary stator winding. The flux interlinking the rotor with the primary stator winding is therefore greater than that interlinking the rotor with the tertiary stator winding and this is one of the reasons why the tertiary induced voltage falls off with an increase in the load. If the voltage necessary for driving the double-frequency load currents through the ohmic resistance of the secondary winding be supplied from an outside source, the flux interlinking the rotor with the tertiary winding may be made equal to, or even greater than, the flux interlinking the rotor winding with the primary stator winding, thus compensating for the ohmic drops in the stator windings. In the system shown in Fig. 1, the working currents of double frequency traverse the main field windings 21 and 22, establishing alternating fields in the machines 11 and 12, whereby a suitable electromotive force is induced in the armatures 19 and 20 to compensate for the ohmic drops within the machine 15.

Figure 2:
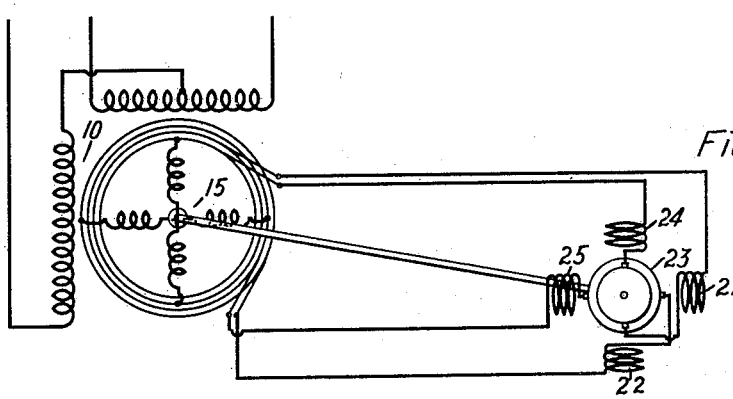

It is unnecessary to employ a separate booster machine for each phase of the rotor winding of the phase converter, as composite machines may be provided which combine the functions of two or more separate booster machines. A system of this character is shown in Fig. 2 wherein a phase converter 10, in all respects similar to that shown in Fig. 1, is connected to a composite booster machine 23 having, in this case, two distinct armature windings and two commutators, as indicated. Main field windings 21 and 22 are employed as in the machines of Fig. 1, each being mounted in quadrature relation to the brushes with which it is connected. It is desirable not only to compensate for the ohmic drop but for the reactive drop in the rotor 15 of the phase converter 10 and it is therefore desirable to generate electromotive forces in the booster machine 23 that shall be out of phase with respect to the load currents flowing through the series field winding thereof. For this purpose, I provide conductively energized cross field windings 24 and 25 and suitably adjust the ampere turns therein with respect to the ampere turns in the conductively associated armature windings to produce the desired cross field. All the field windings thus described are in operative relation to both armature windings.

Figure 3:
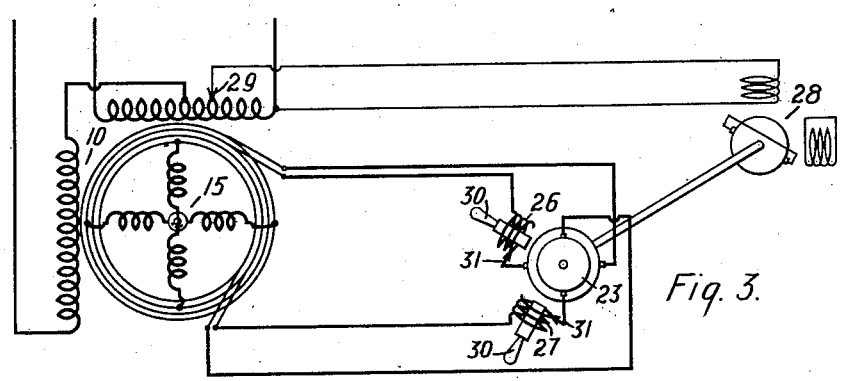

It is not necessary, furthermore, to employ distinct main and cross field windings for each armature winding in the machine 23, as the same effect may be produced by a single field winding combining the functions of each main field winding and associated cross-field winding, respectively. A system of this character is indicated in Fig. 3 wherein a phase converter 10, similar to that previously employed, is associated with an auxiliary machine 23 having two separate armature windings, as in the system of Fig. 2, but provided with a single field winding 26 combining the effects of the field windings 22 and 25 in the system of Fig. 2 and provided with an additional field winding 27, combining the effects of the field windings 21 and 24 in the system of Fig. 2. The auxiliary machine 23 in Fig. 3 is driven by an independent motor 28, preferably of the commutator type, as shown, and said motor may be varied in speed by any suitable means, such, for example, as by varying the voltage of supply at a tap 29. The phase relation of the voltage induced in the machine 23, with respect to the load currents of the rotor 15, may be varied either by adjusting the brushes on the machine 23 or by shifting the axes of the poles 26 and 27, as, for example, by suitable handles 30—30 connected thereto. The magnitude of the booster voltage may be varied, either by adjusting the number of turns in the field windings 26 and 27 by suitable adjusting taps 31—31 thereupon or by adjusting the speed of the driving motor 28.

Figure 4:
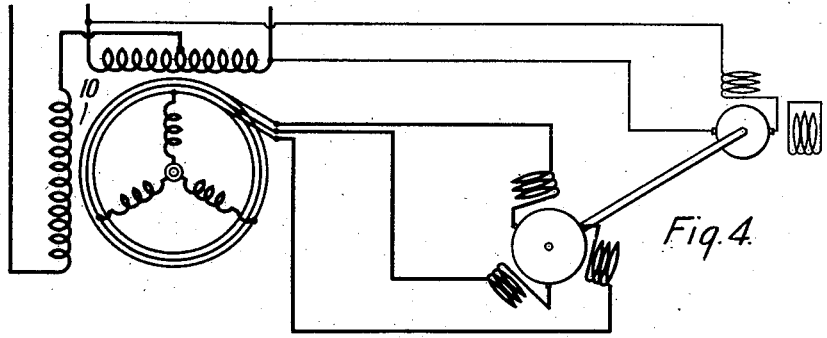

The system of Fig. 4 is, in its general aspects, similar to that of Fig. 3 except that a phase converter having a three-phase secondary winding is employed, permitting the use of an auxiliary booster machine of the polyphase commutator type having three brushes equally spaced apart on the commutator and having three field winding systems properly associated therewith, as shown.

It is frequently desirable that the full-load currents of the phase converter do not traverse the armature winding of the exciter machine because of commutation difficulties. Under these conditions, I may employ a system of the character shown in Fig. 5 wherein a phase converter 10, of the type shown in Fig. 1, is associated with a booster machine 32 having two armature windings each of which is provided with a commutator cylinder, as shown. Suitable brushes 33—33 bear upon one commutator cylinder in a vertical axis and are connected directly together and, in like manner, brushes 34—34 bearing upon the other commutator cylinder in a horizontal axes are connected together. Suitable field windings 35 and 36 are connected in series with the phase 16 of the phase converter 10 and are mounted in line with the brushes 33—33 and 34—34, respectively, and, in like manner, field windings 37 and 38 are connected in series with the phase winding 17 of the machine 10. The winding 36 induces a rotational voltage between the brushes 33—33 when the machine 32 is driven by any suitable means, such, for example, as a direct-current motor 39, and a proportionate voltage is induced in the field winding 35 by transformer action for supply to the phase winding 16.

Figure 5:
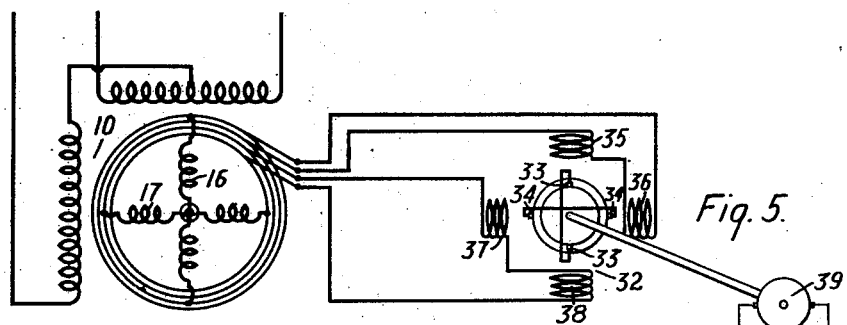
Figure 6:
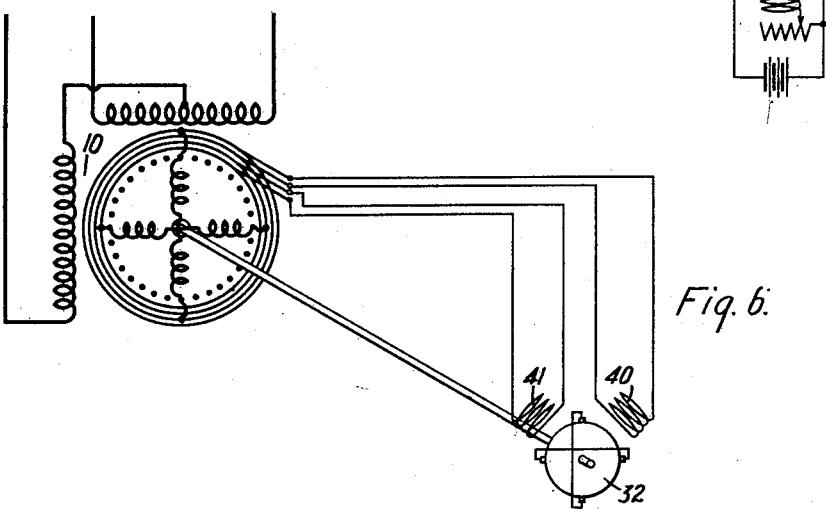

The system of Fig. 6 has the same general operating characteristics as that of Fig. 5 except that the functions of the main and cross-field windings 36 and 35 are combined in a single field winding 40 and, in like manner, the field windings 37 and 38 are combined in a similarly obliquely disposed field winding 41. The auxiliary machine 32 is arranged to be driven from the shaft of the main phase converter 10 rather than being supplied with a separate driving motor and, furthermore, the phase converter 10 is shown as provided with a squirrel-cage winding in addition to its phase winding, as is customary in the art.

In the systems discussed to this point, the exciting current for the booster machine is derived from the secondary winding of the phase converter, with attendant undesirable lowering of the power factor thereof. The system shown in Fig. 7 embodies means whereby the booster machine may be rendered self-exciting. A phase converter 10 is provided with primary and tertiary stator windings 13 and 14 and with a three-phase rotor winding 47. A short-circuiting impedance device 48 is connected across two branches of the Y-connected rotor winding 47, as indicated in my copending application, Serial No. 83,776, filed March 13, 1916, and slip rings 18 are connected to terminals of said winding and coacting with a suitable pair of brushes. An auxiliary machine 49 has its armature mounted on the shaft of the phase converter 10 and said armature is provided with a commutator cylinder upon which bear four brushes 50—50 and 51—51. A main field winding 52 is mounted in line with the brushes 51—51 and a cross field winding 53 is mounted in line with the brushes 50—50. The machine 49 may be employed as a starting motor by closing switches 44 and 46, as indicated in the sequence chart of Fig. 8, whereby the cross field winding 53 is short circuited and the primary stator current of the machine 10 flows through the main field winding 52 and through the armature of the machine 49 via the brushes 50—50. When the rotor of the machine 10 has been brought up to the proper running speed, the switches 44 and 46 are opened and the switches 42, 43, and 45 are closed, as further indicated in Fig. 8, whereupon the machine 49 is connected for boosting purposes. The flow of current through the cross field winding 53, which is connected across the slip rings 18—18, produces a field in line with the brushes 50—50 and a resultant rotational electromotive force appears at the brushes 51—51, providing a flow of magnetizing current of proper phase through the armature of the machine 49 between the brushes 51—51, and a rotational electromotive force is produced by the field of said current and appears at the brushes 50—50. This latter E. M. F. is induced by transformer action into the field winding 53 and is thence transmitted to the phase winding 47.

The system of Fig. 9 is, in general, similar to that of Fig. 7, except that the armature of the booster machine 49 is connected in parallel with the cross field winding 53 through the brushes 50—50, thus permitting running the machine 49 at over-synchronous speed with good commutation, at the same time reducing the self-inductive effect of the cross-field winding. The operation of the respective switches is the same as that of the corresponding switches in Figs. 7 and 8. The machine 49 is shown as mounted to be driven by a repulsion motor 64 in order to more readily attain the desired over-synchronous speeds.

The system of Fig. 10 illustrates the possibility of boosting the voltage in a Y-connected three-phase secondary winding by means of a single booster machine shown at 54, the field winding 55 of said booster machine being shunted by an adjustable resistor 56 in order to vary the amount of exciting current flowing therethrough, and the generator 54 is shown as connected to be driven by the direct-current motor 57 which is employed to drive the blower fan 58, as in a railway locomotive.

While I have shown my invention in a plurality of different forms, it will be obvious to those skilled in the art that it is susceptible of multifarious additional forms and modifications, the component parts of many of the systems shown being operative in connection with the proper component parts of others of the systems shown. I desire, therefore, that only such limitations shall be placed thereupon as are imposed by the prior art or as fall within the scope of the appended claims.

I claim as my invention:

1. The combination with a phase converter for producing polyphase currents from a single-phase source, of means for producing a compounding voltage in the secondary winding thereof.

2. The combination with a substantially constant speed phase converter, of means for adjusting the working secondary voltage thereof in direct relation to the load thereon.

3. The combination with a substantially constant-speed phase converter, of means for automatically adjusting the working secondary voltage thereof in direct relation to the load thereon.

4. The combination with a single-phase polyphase phase converter, of a booster dynamo-electric machine connected in a secondary circuit thereof, means for driving said machine and means for exciting a field winding of said booster machine with current of the frequency of the working currents in the said secondary circuit.

5. The combination with a source of single-phase alternating currents, of a phase-converter connected thereto, and means for supplying exciting current to the secondary winding of said converter having substantially twice the frequency of said supply circuit.

6. The combination with a source of single-phase alternating currents, of a phase-converter connected thereto, means for supplying exciting current to the secondary winding of said converter of substantially twice the frequency of said supply circuit and means for automatically varying the amount of said exciting current with changes in the load on said converter.

7. The combination with a phase converter provided with a secondary member having a multi-phase winding, of means for supplying exciting current to a plurality of phases in said winding in addition to the currents induced therein.

8. The combination with a phase converter provided with a secondary member having a multi-phase winding, of means for supplying exciting current to all the phases in said winding in addition to the currents induced therein.

9. The combination with a source of single-phase alternating current, of a phase converter connected thereto and provided with a secondary member having a multi-phase winding, and means for supplying exciting current to a plurality of the phases of said winding having substantially twice the frequency of said supply.

10. The combination with a source of single-phase alternating current, of a phase converter connected thereto and provided with a secondary member having a multi-phase winding, and means for supplying exciting current to all the phases of said winding having substantially twice the frequency of said supply.

11. The combination with a source of alternating currents, of a phase-converter connected thereto, and means for supplying exciting current to the secondary winding of said converter having substantially twice the frequency of said supply circuit.

12. The combination with a source of alternating currents, of a phase-converter connected thereto, means for supplying exciting current to the secondary winding of said converter of substantially twice the frequency of said supply circuit and means for automatically varying the amount of said exciting current with changes in the load on said converter.

13. A phase balancer comprising a polyphase dynamo-electric machine having one of its windings adapted for connection to a normally unbalanced polyphase system, a second winding in inductive relation thereto in which super-frequency alternating voltages are induced by the currents traversing the said first winding, and means influenced by the resulting induced super-frequency currents for inherently amplifying the values of the said induced voltages for producing a balancing effect on the voltages in said polyphase system.

14. A phase balancer comprising a polyphase dynamo-electric machine having one of its windings adapted for connection to a normally unbalanced polyphase system, a second polyphase winding in inductive relation thereto in which super-frequency alternating voltages are induced by the currents traversing said first winding, and an alternating-current, commutator-type booster connected in series with the phases of said second winding in order to inherently amplify the super-frequency alternating voltages induced therein, said booster having such characteristics as to substantially balance the terminal voltages of said first winding.

15. A phase balancer comprising a polyphase dynamo-electric machine having a polyphase winding adapted for connection to a normally unbalanced polyphase system, and a second polyphase winding in inductive relation thereto in which super-frequency alternating currents are induced by the currents traversing said first winding, and means influenced by the currents obtaining in each phase of said second winding for inherently amplifying said currents by such amounts that symmetrical polyphase conditions may be maintained in said first winding under all conditions.

16. A phase balancer comprising a main polyphase dynamo-electric machine, and means for inherently generating alternating electromotive forces that are in phase with, proportional to, and of the same frequency as, the alternating currents impressed thereupon, said means being connected to the said main machine and having such characteristics as to cause the terminal voltages of said first winding to be substantially balanced.

17. A phase balancer comprising a main polyphase dynamo-electric machine, and booster-means connected in series with one of the windings of said main machine, said booster-means inherently generating electromotive forces that are in phase with, in proportion to, and of the same frequency as, the alternating currents impressed thereupon, the aforementioned electromotive forces being of such values as to substantially amplify the balancing action of said dynamo-electric machine.

18. A phase balancer comprising a main dynamo-electric machine having one of its windings adapted for connection to a polyphase system and a second winding in inductive relation thereto, booster-means connected in series with said second winding, said booster-means generating electromotive forces that are in phase with, proportional to, and of the same frequency as, the alternating currents impressed thereupon in order to substantially balance the voltages of said polyphase system.

19. A phase balancer comprising a main polyphase dynamo-electric machine having one of its windings adapted for connection to an alternating-current distributing system and a second polyphase winding in inductive relation thereto, and booster-means connected in each phase of said second winding, said booster-means generating alternating voltages that are in phase with, proportional to, and of the same frequency as, the alternating currents impressed thereupon.

20. The combination with a polyphase system, of a phase balancer comprising a main polyphase dynamo-electric machine having polyphase secondary windings, and alternating-current, commutator-type booster-generators connected with the several secondary phases of the said main machine and generating alternating voltages in phase coincidence with, proportional to, and of the same frequency as, the currents traversing said booster-generators in order that the balancing action of the main machine may be amplified.

21. The combination with a polyphase system, of a phase balancer comprising a main polyphase dynamo-electric machine having polyphase secondary windings, means for independently generating watt-component and wattless-component electromotive forces and for introducing these components in each secondary phase of said main machine, and means for varying the value of each component in order to amplify the balancing action of said main machine.

22. A phase balancer comprising a main polyphase dynamo-electric machine having polyphase secondary windings, auxiliary sources of electromotive forces connected in each secondary phase thereof, said sources generating electromotive forces that are displaced ninety degrees from each other, and means for adjusting the values of said electromotive forces whereby the balancing action of said main machine may be amplified.

23. A dynamo-electric machine for use as a shunt phase balancer for a polyphase distribution system, including, in combination, a pair of relatively rotatable magnetic members, a winding on one of said members adapted for connection in shunt with said distribution system, a closed-circuited winding on the other of said members, and means associated with said last-mentioned member for introducing suitable magneto-motive forces into said machine for balancing the terminal voltages of said first-mentioned winding.

24. A dynamo-electric machine for use as a shunt phase balancer for a polyphase distribution system, including, in combination, a pair of relatively rotatable magnetic members, a winding on one of said members adapted for connection in shunt with said distribution system, a closed-circuited winding on the other of said members, and means associated with said last-mentioned member for introducing polyphase currents of the proper frequency, phase and magnitude into said dynamo-electric machine whereby balanced polyphase conditions may be maintained in said winding connected to said distributing system under all conditions.

25. A dynamo-electric machine for use as a shunt phase balancer for a polyphase distribution system, including, in combination, a pair of relatively rotatable magnetic members, a winding on one of said members adapted for connection in shunt with said distribution system, and means associated with the other of said members for producing polyphase magneto-motive forces of the proper frequency, magnitude and phase to develop in said first mentioned member a magnetic flux whereby balanced polyphase conditions may be maintained at the terminals of said winding under all conditions.

26. A dynamo-electric machine for use as a shunt phase balancer for a polyphase distribution system, including, in combination, a pair of relatively rotatable magnetic members, a winding on one of said members adapted for connection in shunt with said distribution system, a second winding on the other of said members, and means for introducing into said second winding polyphase currents of the proper magnitude, frequency and phase to augment the currents induced in said second winding by reason of the unbalanced polyphase currents flowing in said first winding.

In testimony whereof, I have hereunto subscribed my name this 29th day of June, 1916.

RUDOLF E. HELLMUND.